Jan. 17, 1950     E. E. PRUDEN     2,495,021
FISH LURE
Filed March 24, 1949
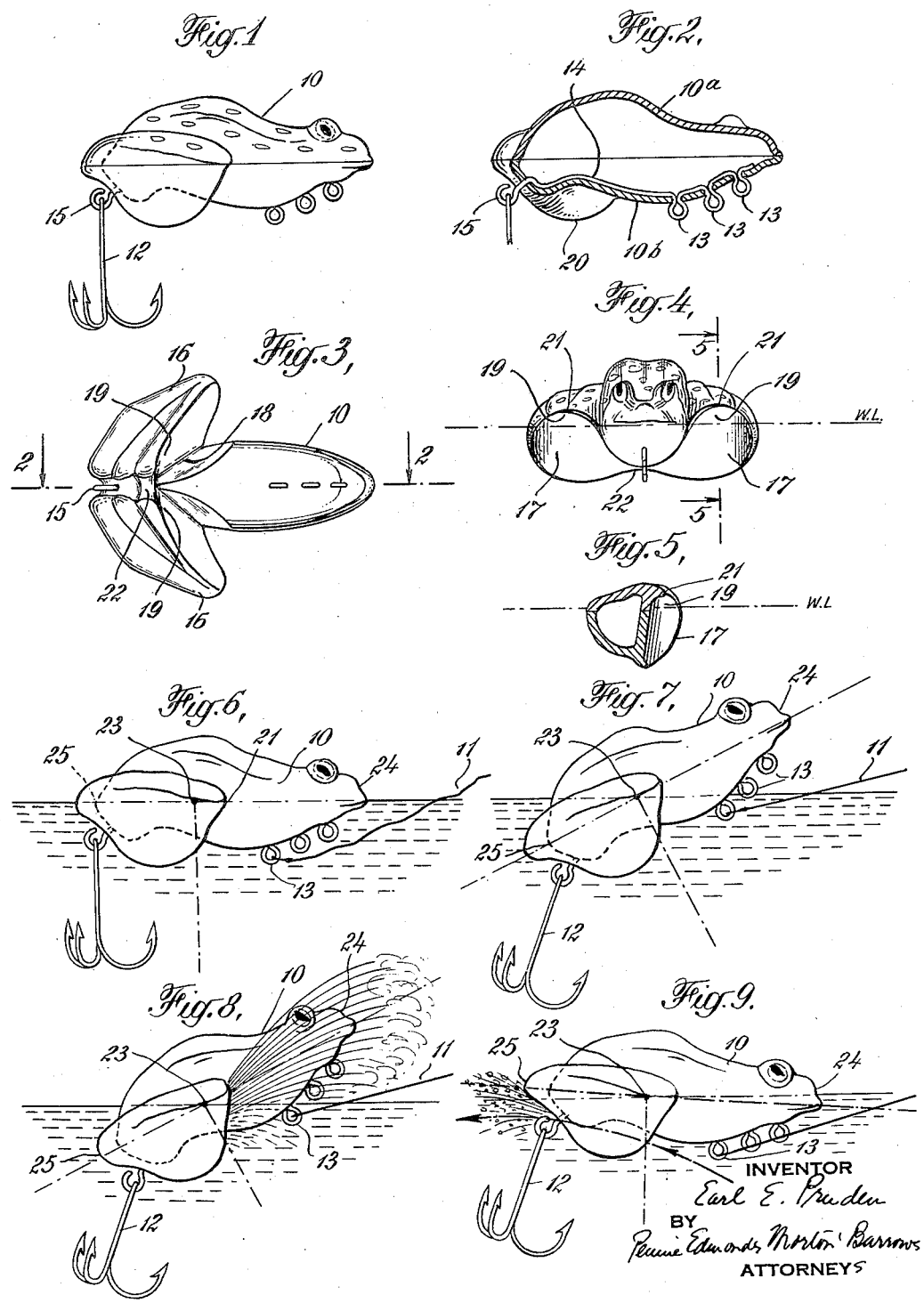
INVENTOR
Earl E. Pruden
BY
Pennie Edmonds Morton Barrows
ATTORNEYS Patented Jan. 17, 1950

2,495,021

UNITED STATES PATENT OFFICE 2,495,021

FISH LURE

Earl E. Pruden, Dover, N. J.

Application March 24, 1949, Serial No. 83,146

4 Claims. (Cl. 43—42.23)

This invention relates to fish lures and is concerned more particularly with a novel lure which may be caused by manipulation of the line attached thereto to perform a series of bobbing movements, so that the lure seems to be alive.

The lure of the invention may be made in various forms and of different materials and it comprises an elongated buoyant body adapted to float with its long axis approximately horizontal. The body is provided with means on its under surface and forward of its center for attachment to a line and it has one or more hooks attached to depend from it near its rear end. Between the center of the body and the point of attachment of the hook, the body is provided with lateral extensions forming a scoop, which has its concave surface facing forward. The scoop projects below the bottom of the body and, with the latter, defines a pair of channels closed at their tops and converging to the rear. The lower edge of the scoop is formed with an outlet channel leading rearwardly from the meeting place of the convergent channels. When the lure, constructed as described, is drawn through the water by the line, the action of the water on the surfaces of the scoop and body causes the lure to oscillate about a transverse axis through the center of buoyancy of the lure, so that the lure has a bobbing action and appears to be alive.

For a better understanding of the invention, reference may be made to the accompanying drawing, in which Fig. 1 is a view in side elevation of one form of the new lure;

Fig. 2 is a sectional view on the line 2—2 of Fig. 1;

Fig. 3 is a bottom plan view of the lure;

Fig. 4 is a view of the lure in front elevation;

Fig. 5 is a sectional view on the line 5—5 of Fig. 4;

Fig. 6 is a view of the lure in side elevation and afloat; and

Figs. 7, 8, and 9 are views similar to Fig. 6 and showing the action of the lure, when it is drawn through the water by a pull on the line attached thereto.

The new lure is illustrated as comprising an elongated buoyant body 10 having the form of a frog, but it is to be understood that the body may be cylindrical, or have the shape of a minnow or any other elongated shape. The body of the lure shown is hollow and may conveniently be made of upper and lower sections 10a, 10b made of molded plastic material, the sections being united along their edges with their concave faces opposed. The body of the lure is so proportioned that, when it is afloat, it lies with its longitudinal axis approximately horizontal.

The body is provided on its under surface forward of its center with means for attaching a line 11 thereto, and it is also provided near its rear end with means for attaching a single hook or a gang hook 12. In the lure illustrated, the line may be attached to one or the other of a trio of loops 13, which are formed in a length of wire 14, which may be embedded in the bottom section 10b of the body during the formation thereof. The wire is embedded so that the loops 13 project beyond the surface of the body and the wire extends rearwardly within the body from the rearmost loop 13 and projects through the wall of the body near the rear end thereof to terminate in a loop 15, to which the hook 12 may be attached to hang freely.

To the rear of its center, the body is formed with a scoop having a concave surface facing forwardly and, in the construction illustrated, the scoop is formed by a pair of lateral extensions 16, which project outwardly and forwardly. The forward faces 17 of the extensions flare in the forward direction and, in front of the scoop, the bottom surface of the body is curved inwardly, as indicated at 18, so that the body and extensions define a pair of channels 19, which are closed at the top and converge to a point at the roots of the extensions and in the longitudinal axis of the body. Preferably, the extensions project downwardly beyond the bottom of the body as indicated at 20, and the front edges 21 of the tops of the extensions lie part way up the height of the body. The lower edges of the extensions are cut away near the rear end of the body in the vertical median plane therethrough to form a channel 22, which extends along the bottom of the body between the extensions to the rear end of the body.

When the lure is afloat with no tension on the line 11, the body 10 of the lure assumes the position shown in Fig. 6, in which the body lies with its longitudinal axis approximately horizontal and in the level of the surface of the water. In this position of the body, the tops 21 of the front edges of the extension also lie approximately in the water level and the center of buoyancy of the lure lies in a transverse axis at approximately the point indicated at 23. When line 11 is drawn in so as to move the lure through the water, the first action that occurs is that the body swings counter-clockwise about the transverse axis of buoyancy indicated at 23 with the front end 24 of the lure rising and the rear end 25 falling. Movement of the lure through the water now causes water to be sprayed forwardly, upwardly, and outwardly, as indicated in Fig. 8, by the flaring concave surfaces of the scoop. As the movement of the lure through the water continues, the pressure of the water on the forward faces of the scoop causes water to flow to the rear through the convergent channels 19, the water escaping through channel 22. This movement of the water through channel 22 results in the application of a lifting force to the rear end of the lure, so that the lure swings clockwise about the axis of buoyancy 23 and its rear end rises to permit the water acting on the faces of the convergent channels to escape, while the forward end of the lure is depressed. As the lure moves forward in this position, the water acts with less effect on the forward faces of the scoop, so that the continued pull of the line on loop 13, to which it is connected, results in the lure being swung counter-clockwise to the position shown in Fig. 7. The cycle of movements of the lure is then repeated.

I have found in practice that, if the line is connected to the foremost loop 13, the drawing in of the line causes the lure to have a gentle oscillation about its transverse axis of buoyancy with the ends of the lure bobbing up and down through small arcs. If the line is connected to the middle loop 13, the oscillation of the lure, as it is advanced through the water, increases in vigor, and the ends of the lure move through longer arcs. When the line is connected to the rearmost loop 13, which lies well under the bottom of the body and closest to the axis of buoyancy, the oscillatory movements of the lure are quite violent. The spraying of water forwardly and upwardly by the forward faces of the scoop, as shown in Fig. 8, attracts the attention of the fish and the bobbing movement of the lure gives it the appearance of being alive.

The scoop portion of the lure comprising the lateral extensions may be of unitary construction and separately formed, as by molding, and then attached by suitable means to an elongated buoyant body of any desired form. If desired, the scoop can be made of sheet metal or wood. The position of the scoop may vary somewhat but, to obtain the desired effect, the scoop should be disposed to the rear of the center of buoyancy and the line attached to the body ahead of the center. By forming the body of the lure of plastic material in a molding operation, the scoop and body may be formed as one and this arrangement is preferred.

I claim:

1. A fish lure which comprises an elongated buoyant body adapted to float with its longitudinal axis substantially horizontal and having means on its under surface forward of its center for attachment to a line, a pair of lateral extensions from the body near its rear end having outwardly flared forward faces extending above the bottom of the body adjacent the roots of the extensions and with the surface of the body defining rearwardly convergent channels meeting substantially in the longitudinal axis of the body, the rear ends of the extensions meeting below the under surface of the body and defining a channel lengthwise of the body and open at its ends, and a hook attached to the body adjacent its rear end.

2. A fish lure which comprises an elongated buoyant body adapted to float with its longitudinal axis substantially horizontal and having means on its under surface forward of its center for attachment to a line, a pair of lateral extensions from the body near its rear end having outwardly flared forward faces extending above the bottom of the body adjacent the roots of the extensions, the upper ends of said surfaces extending inwardly toward the body and with the surface of the body defining rearwardly convergent channels meeting substantially in the axis of the body, the rear ends of the extensions defining a channel extending rearwardly from the meeting place of the convergent channels and open at its rear end and the lower edges of the extensions lying below the level of the bottom of the body adjacent the rear ends of the extensions, and a hook attached to the body adjacent its rear end.

3. A fish lure which comprises an elongated buoyant body adapted to float with its longitudinal axis substantially horizontal and having means on its under surface forward of its center for attachment to a line, a pair of lateral extensions from the body near its rear end having flaring forward surfaces shaped to form rearwardly convergent channels meeting beneath the body adjacent the roots of the extensions, the rear ends of the extensions meeting beneath the body and defining a channel leading rearwardly from the convergent channels and to the rear end of the body, and a hook attached to the body adjacent its rear end.

4. A fish lure which comprises an elongated buoyant body adapted to float with its longitudinal axis substantially horizontal, means on the under surface of the body forward of its center for attachment to a line, a scoop attached to the body to the rear of its center, the scoop having a concave surface facing forward and with the under surface of the body defining a pair of channels closed at their tops and converging to the rear, the lower edge of the scoop having an outlet from the point of convergency of the channels, and a hook attached to body to the rear of the scoop.

EARL E. PRUDEN.

No references cited.